PATENTED OCT 3 1972 3,695,129
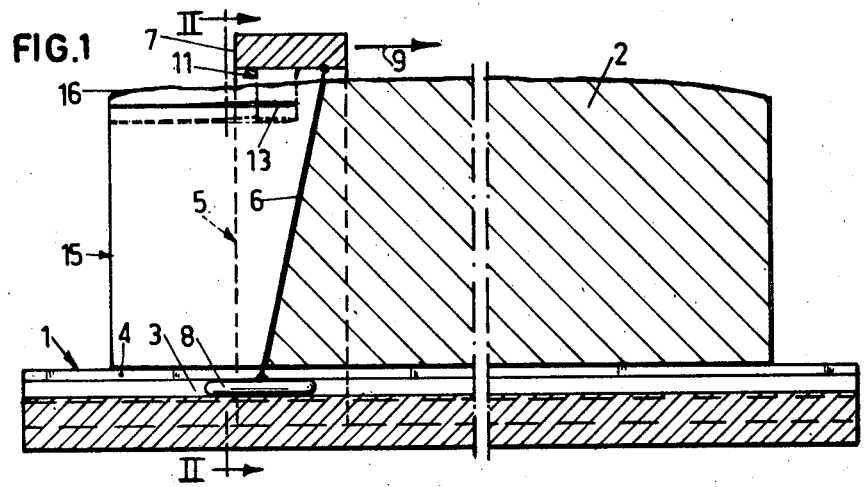
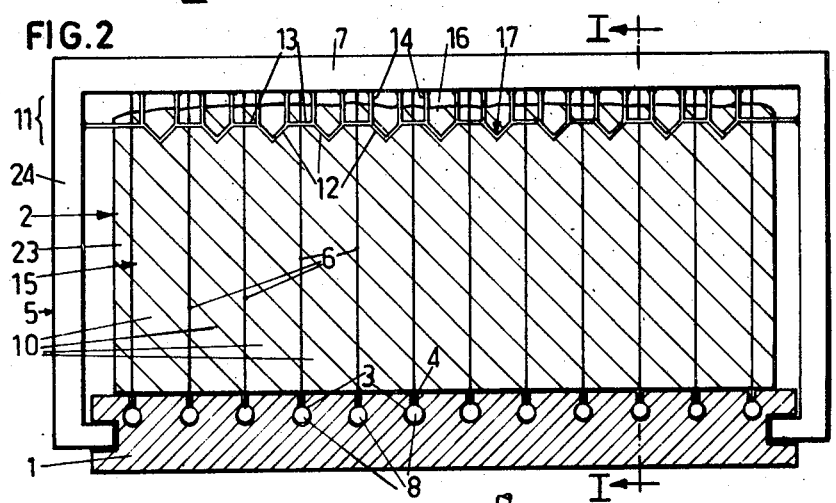
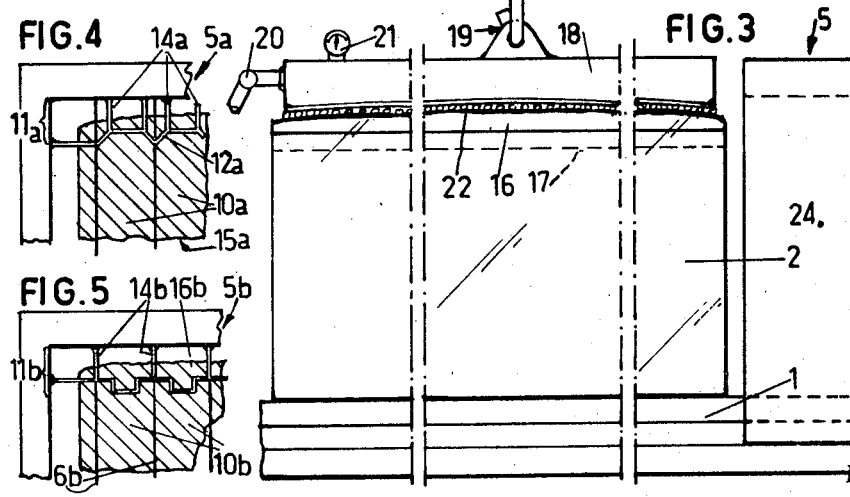
INVENTOR
Berend Vrijma
BY Sandoe, Hopgood & Calimafde
ATTORNEYS

United States Patent

Vrijma

[15] 3,695,129
[45] Oct. 3, 1972

[54] APPARATUS FOR CUTTING A BLOCK OF PLASTIC MATERIAL

[72] Inventor: Berend Vrijma, Vuren, Netherlands

[73] Assignee: Calsilox S.A. Luxemburg Ville, Luxembourg

[22] Filed: June 22, 1970

[21] Appl. No.: 48,268

[30] Foreign Application Priority Data

June 26, 1969 Netherlands.............6909802

[52] U.S. Cl. .........................83/5, 83/152, 83/614, 83/620, 425/306, 425/311
[51] Int. Cl. .............................................B26d 3/06
[58] Field of Search............83/5, 100, 152, 614, 620; 25/105, 108, 112, 113; 18/DIG. 46, DIG. 60; 425/301, 303, 306, 311

[56] References Cited

UNITED STATES PATENTS

| | | | |
|---|---|---|---|
| 2,694,846 | 11/1954 | Olsson et al. | 25/105 |
| 2,700,177 | 1/1955 | Mottet | 18/DIG. 60 |
| 3,088,186 | 5/1963 | Mennitt | 25/112 |
| 2,896,298 | 7/1959 | Olsson | 25/105 X |
| 2,346,393 | 4/1944 | Render | 25/112 |
| 3,204,315 | 9/1965 | Akerfors | 25/113 X |
| 3,412,439 | 11/1968 | Baker | 25/120 X |

FOREIGN PATENTS OR APPLICATIONS 1,235,208  2/1967  Germany.................25/105

Primary Examiner—J. Spencer Overholser
Assistant Examiner—B. D. Tobor
Attorney—Sandoe, Hopgood and Calimafde

[57] ABSTRACT

An apparatus for cutting a block of material in a plastic state, more particularly light weight concrete, grooved at the top, wherein a top crust cut loose from the block is removed by suction. If the crust is cut loose from the block by a horizontal cutting wire, and the grooves are cut away by means of blades, the material of the grooves remains behind on the top surface of the block, when the crust is removed by suction.

The material of the crust and the groove can be removed simultaneously by suction if the crust is cut loose along the profile of the grooves.

2 Claims, 5 Drawing Figures

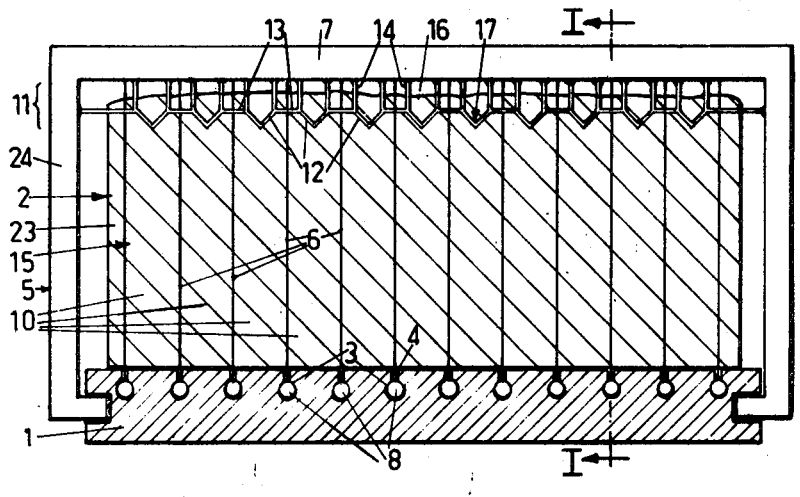

APPARATUS FOR CUTTING A BLOCK OF PLASTIC MATERIAL

The invention relates to an apparatus for cutting a block of plastic material, more particularly lightweight concrete, grooved at the top, wherein a top crust cut loose from the block is removed by suction.

In the known method of the kind specified, the crust is cut loose from the block by a horizontal cutting wire, and the grooves are cut away by means of blades having the width and profile of the grooves with which the block is to be formed. When the crust is removed by suction, the material of the grooves remains behind on the top surface of the block. The block is then hardened together with the material of the grooves. The hardened material, already cut loose, is then removed from the grooves as waste.

It is an object of the invention to simplify the removal of the material from the grooves and reduce the amount of waste.

To this end, the method according to the invention is characterized in that the crust is cut loose along the profile of the grooves, and the material of the crust and the groove is removed simultaneously by suction. This method maintains a connection between the material of the crust and the material of the grooves, so that when the crust is lifted by suction, the material of the grooves is also lifted, and all such material can be removed in the same operation before the block is hardened. This removed material which is still in a plastic state, can be re-used, for instance, in the case of lightweight concrete. To this end plastic material is added, mixed with water, to the raw materials of other lightweight concrete articles to be produced subsequently.

The invention also provides an apparatus for performing the method according to the invention, comprising cutting means for cutting the material of a crust loose from a block in a plastic state, and for cutting loose the material of grooves with which the top surface of a block is to be formed, and comprising removal means, comprising suction means, for removing the crust from the block, characterized by cutting means which cut the crust loose form the block along the section of the grooves.

The invention will be clearly understood from the following description, with reference to the drawings, wherein:

FIG. 1 is a longitudinal section, taken on the line I—I in FIG. 2, through an apparatus according to the invention, seen during cutting, FIG. 2 is a section, taken on line II—II in FIG. 1, FIG. 3 is a side elevation of the apparatus shown in FIG. 1, during the removal of the crust and, FIGS. 4 and 5 each show partial sections, corresponding to FIG. 2, through variant embodiments of the apparatus according to the invention.

FIGS. 1 and 2 show a bed on which plastic lightweight concrete 2 to be cut is disposed. The bed 1 is formed with grooves 3 which are parallel with the arrow 9 and are open at the top, due to slots 4. The apparatus also consists of a cutting frame 5 which can be displaced in the direction indicated by arrow 9 and has cutting wires 6 each of which is tensioned between a transverse beam 7 and a tensioning member 8 displaceable in the grooves 4.

According to the invention the cutting frame 5 also has cutting means formed by a cutting member 11 having a profile corresponding to the profile of the upper surface of a block 15 to be cut out of the material 2, the block 15 being subdivided in the embodiment illustrated by cutting wires 6 into parts 10 of the block, when the cutting frame 5 is moved in the direction indicated by the arrow 9.

The cutting member 11 consists of a number of V-shaped blades 12 which are suspended from the transverse beam 7 by hangers 14 and which are interconnected by means of horizontal blades 13 arranged to intercept and cut through the upper surface of the block 15.

At the same time as the block 15 is cut up into portions 10, the material of the crust 16 and the material of the grooves 17 are cut loose from the material of the block 15.

After cutting, a suction cap 18 which is suspended from lifting means 19 and which can be communicated via a cut-off valve 20 to a vacuum source, for instance, a vacuum pump, is disposed on the top of the material 2 (FIG. 3). Gauze or crust-retaining means 22 is tensioned or disposed over the bottom of the suction cap 18. When an adequate vacuum has been set up in the cap 18, as indicated by a manometer 21, the suction cap 18, together with the material of the crust 16 pulled against the gauze 22, and the material forming a unit therewith, is lifted from the grooves 17 and removed.

In contrast with the embodiment disclosed hereinbefore, the cutting member 11 can be disposed upstream of the cutting wires 6 on the transverse beam 7. Moreover, the cutting member 11 can be moved at an earlier or later stage through the material 2, independently of the cutting wires 6. If the block 15 is not subdivided into portions 10, either no cutting wires 6 are used, or only two cutting wires are used for cutting off lateral crusts 26.

Alternatively, material 2 disposed on a displaceable bed can be moved in relation to a stationary cutting member 11.

The number of hangers 14 can be substantially smaller than shown in FIG. 2.

Preferably, the cutting member 11 is located at its ends by blades 13 on uprights 24 of the cutting frame 5.

FIG. 4 shows a cutting member 11a adapted to a differently-profiled upper surface of a block 15a. Blades 12a cut edges of rims from the portion 10a of the block.

FIG. 5 shows another differently-profiled cutting member 11b. The hangers 14b are disposed in the plane of the cutting wires 6b. The number of portions of the crust 16b is therefore reduced. The suctional removal of the crust 16b is more reliable, due to the reduction of vacuum leakage losses.

I claim:

1. An apparatus for cutting a block of material in the plastic state, such as lightweight concrete which comprises,
    a bed for supporting said block,
    a cutting frame cooperatively associated with said bed such that the cutting frame and block are adapted to move relative to each other so that the frame effectively passes over and along the sides of said block from one end to the other, said cutting frame having a horizontal member disposed above the top of and transverse to said block, and side members depending downwardly therefrom along opposite sides of said block when a block is supported on said bed, crust-cutting means supported by and along said horizontal member transverse to said block for removing the upper crust of said block, said crust-cutting means comprising an array of interconnected horizontal and groove-cutting blades arranged to intercept and cut through the block below the upper crust thereof as the cutting frame and block are caused to more relative to each other such that the top surface of the block after cutting and removal of the crust has cut into it grooves spaced transversely of said block and running longitudinally thereof, and a suction cap arranged to cover the top of said block for removing by suction the top crust severed by said crust-cutting means, said cap having retaining means against which the severed crust is held by suction during the removal thereof from the top of the block.

2. The cutting frame of claim 1, wherein said frame also has spaced cutting wires connected to said horizontal member and depending downwardly therefrom to tension means moveably coupled to spaced grooves in said bed disposed longitudinally thereof, such that as the frame and block are moved relative to each other, said wires cut the block into sections while the said wire-tensioning means move relatively along the grooves of the bed together with the frame.

* * * * *